(12) United States Patent
Kourie (10) Patent No.: US 11,370,291 B2
(45) Date of Patent: Jun. 28, 2022

(54) METHOD AND SYSTEM FOR GEAR SHIFTING IN A HYBRID POWERTRAIN

(71) Applicant: Scania CV AB, Södertälje (SE)

(72) Inventor: Afram Kourie, Södertälje (SE)

(73) Assignee: Scania CV AB, Södertälje (SE)

(*) Notice: Subject to any disclaimer, the term of this patent is extended or adjusted under 35 U.S.C. 154(b) by 61 days.

(21) Appl. No.: 15/779,984

(22) PCT Filed: Nov. 29, 2016

(86) PCT No.: PCT/SE2016/051180
§ 371 (c)(1),
(2) Date: May 30, 2018

(87) PCT Pub. No.: WO2017/095308
PCT Pub. Date: Jun. 8, 2017

(65) Prior Publication Data
US 2018/0345782 A1 Dec. 6, 2018

(30) Foreign Application Priority Data

Dec. 1, 2015 (SE) .................................. 1551560-4

(51) Int. Cl.
*B60K 6/48* (2007.10)
*B60W 10/06* (2006.01)
(Continued)

(52) U.S. Cl.
CPC .............. *B60K 6/48* (2013.01); *B60W 10/06* (2013.01); *B60W 10/08* (2013.01); *B60W 10/10* (2013.01);
(Continued)

(58) Field of Classification Search
CPC .. B60W 20/11; B60W 50/0097; B60W 20/30; B60W 30/19; B60W 10/10;
(Continued)

(56) References Cited

U.S. PATENT DOCUMENTS 4,905,544 A * 3/1990 Ganoung ............... B60W 30/18
477/109
6,278,915 B1 * 8/2001 Deguchi ................ B60K 6/543
701/22

(Continued)

FOREIGN PATENT DOCUMENTS

CN 103386985 A 11/2013
CN 104417526 A 3/2015
(Continued)

OTHER PUBLICATIONS

Correa F. et al. "Gear Shifting Strategy to Improve the Parallel Hybrid Vehicle Fuel Consumption" 2015 IEEE Vehicle Power and Propulsion Conference (VPPC), IEEE, pp. 1-6, doi: 10.1109/VPPC.2015.7352957; whole document.

(Continued)

*Primary Examiner* — Angelina Shudy
*Assistant Examiner* — Mohamed Abdo Algehaim
(74) *Attorney, Agent, or Firm* — Moore & Van Allen PLLC; W. Kevin Ransom (57) ABSTRACT

The invention relates to a method, system, vehicle, and computer program product for gear shifting in a hybrid powertrain, that comprises an internal combustion engine; an electric machine; a gearbox; and an energy storage unit connected to the electric machine, and at least one control unit arranged in communication with the internal combustion engine, the electric machine, the gearbox and the energy storage unit. The method comprises the steps of: determining an energy level in the energy storage unit; determining an acceleration ability with a subsequent gear; determining a target engine speed for the internal combustion engine based on the energy level in the energy storage unit and the acceleration ability; and controlling the gear shifting based on the target engine speed.

13 Claims, 4 Drawing Sheets (51) Int. Cl.
  *B60W 10/08* (2006.01)
  *B60W 10/10* (2012.01)
  *B60W 30/19* (2012.01)
  *B60W 20/30* (2016.01)
  *B60W 50/00* (2006.01)
  *B60W 20/11* (2016.01)
  *B60W 20/00* (2016.01)

(52) U.S. Cl.
  CPC .......... *B60W 20/11* (2016.01); *B60W 20/30* (2013.01); *B60W 30/19* (2013.01); *B60W 50/0097* (2013.01); *B60K 2006/4825* (2013.01); *B60W 20/00* (2013.01); *B60W 2510/0638* (2013.01); *B60W 2510/10* (2013.01); *B60W 2510/1005* (2013.01); *B60W 2510/244* (2013.01); *B60W 2530/16* (2013.01); *B60W 2710/0644* (2013.01); *B60W 2710/083* (2013.01); *Y02T 10/62* (2013.01)

(58) Field of Classification Search
  CPC ............ B60W 10/08; B60W 10/06; B60W 2710/0644; B60W 2530/16; B60W 2510/244; B60W 2510/1005; B60W 2510/10; B60W 2510/0638; B60W 20/00; B60W 2710/083; B60W 2530/13; B60W 20/15; B60W 10/26; B60W 10/04; B60W 10/101; B60W 10/103; B60W 10/105; B60W 10/107; B60W 10/108; B60W 10/109; B60W 10/11; B60W 10/113; B60W 10/115; B60K 6/48; B60K 2006/4825; B60K 6/20; B60K 6/22; B60K 6/24; B60K 6/26; B60K 6/28; B60K 6/32; B60K 6/36; B60K 2006/4808; B60K 2006/4816; B60K 2006/4833; B60K 2006/4841; Y02T 10/6252; Y02T 10/6286; Y02T 10/6221; Y02T 10/62; F16H 2061/0223; F16H 2059/6815; F16H 2059/148; B60L 50/61
  USPC .......................................................... 701/22
  See application file for complete search history.

(56) References Cited

U.S. PATENT DOCUMENTS

| | | | |
|---|---|---|---|
| 6,988,976 B2* | 1/2006 | Potter | F16H 61/0213 477/115 |
| 7,407,462 B2 | 8/2008 | Tsukada et al. | |
| 9,260,108 B2 | 2/2016 | Wang et al. | |
| 9,688,267 B2 | 6/2017 | Tsuda et al. | |
| 9,701,303 B2* | 7/2017 | Yang | B60W 20/30 |
| 2005/0164829 A1* | 7/2005 | Reitz | B60K 6/48 477/6 |
| 2008/0196954 A1* | 8/2008 | Soliman | B60K 6/48 180/65.25 |
| 2008/0300099 A1* | 12/2008 | Yamamoto | B60K 6/365 477/3 |
| 2009/0288895 A1* | 11/2009 | Klemen | B60W 10/18 180/65.25 |
| 2010/0082208 A1* | 4/2010 | Asai | F16H 61/0213 701/58 |
| 2011/0087390 A1* | 4/2011 | Pandit | B60K 1/00 701/22 |
| 2011/0111905 A1* | 5/2011 | Tiwari | B60L 50/61 475/2 |
| 2013/0040779 A1* | 2/2013 | Schneider | B60W 10/06 477/83 |
| 2013/0296117 A1* | 11/2013 | Shelton | B60K 6/48 477/5 |
| 2013/0297162 A1* | 11/2013 | Dai | B60W 20/30 701/55 |
| 2014/0004994 A1* | 1/2014 | Wang | B60K 6/445 477/4 |
| 2014/0024495 A1* | 1/2014 | Kim | B60K 6/52 477/167 |
| 2015/0012159 A1* | 1/2015 | Honda | B60W 20/00 701/22 |
| 2015/0057866 A1* | 2/2015 | Tseng | B60W 30/19 701/22 |
| 2015/0066333 A1* | 3/2015 | Butcher | F02D 29/02 701/102 |
| 2015/0134160 A1* | 5/2015 | Liang | B60W 10/06 701/22 |
| 2015/0367840 A1 | 12/2015 | Yang | |
| 2016/0047441 A1* | 2/2016 | Bjorkman | B60K 1/02 701/22 |
| 2016/0185336 A1* | 6/2016 | Ueno | B60K 6/48 701/22 |
| 2017/0074188 A1* | 3/2017 | Kim | F02D 41/023 |
| 2017/0122244 A1* | 5/2017 | Dufford | F02D 11/105 |
| 2017/0232958 A1* | 8/2017 | Hata | B60W 20/15 701/22 |
| 2018/0009434 A1* | 1/2018 | Hayakawa | B60K 6/46 |
| 2018/0141554 A1* | 5/2018 | West | B60W 10/06 |

FOREIGN PATENT DOCUMENTS

| | | |
|---|---|---|
| CN | 104842996 A | 8/2015 |
| CN | 104908576 A | 9/2015 |
| EP | 2127984 A1 | 12/2009 |
| WO | 2015146835 A1 | 10/2015 |

OTHER PUBLICATIONS

International Search Report for International Application No. PCT/SE2016/051180 dated Jan. 26, 2017.
Written Opinion of the International Searching Authority for International Application No. PCT/SE2016/051180 dated Jan. 26, 2017.
Scania CV AB, European Application No. 16871151.3, Extended European Search Report, dated Aug. 2, 2019.
Scania CV AB, International Application No. PCT/SE2016/051180, International Preliminary Report on Patentability, dated Jun. 5, 2018.
Scania CV AB, Korean Application No. 10-2018-7017731, Office Action, dated Sep. 11, 2019.
Scania CV AB, Chinese Application No. 201680077487.0, First Office Action, dated Jul. 23, 2020.

* cited by examiner

METHOD AND SYSTEM FOR GEAR SHIFTING IN A HYBRID POWERTRAIN

CROSS-REFERENCE TO RELATED APPLICATION(S)

This application is a National Stage Application (filed under 35 § U.S.C. 371) of PCT/SE2016/051180, filed Nov. 29, 2016 of the same title, which, in turn claims priority to Swedish Application No. 1551560-4 filed Dec. 1, 2015 of the same title; the contents of each of which are hereby incorporated by reference.

FIELD OF THE INVENTION

The present invention relates to a method, system, and computer program for performing gear shifting in a hybrid powertrain and associated vehicle comprising such a system.

BACKGROUND OF THE INVENTION

Hybrid powertrains may be driven by a primary propulsion means such as an internal combustion engine and a secondary propulsion means such as an electric machine. The electric machine is equipped with at least one energy storage, such as an electrochemical energy storage for storing electrical energy and a control unit to control the flow of electrical energy between the energy storage and the electric machine. The electric machine may thus alternately operate as a motor and a generator, based on the operating condition of the vehicle. When the vehicle is braking, the electric machine generates electrical energy, which is stored in the energy storage. The stored electrical energy may be utilized later for the propulsion of the vehicle.

Automatic gear shifting procedures typically involves controlling the powertrain, such that the internal combustion engine maintains an optimum engine speed, i.e. a target engine speed. If the engine speed is too high upshifting is performed and the engine speed is thus decreased. Similarly, if the engine speed is too low downshifting is performed and the engine speed is increased. The optimum engine speed may be determined based on desired fuel consumption, performance or similar. The engine speed affects the fuel consumption and it is therefore desired to keep the engine speed as low as possible while maintaining the drive torque requested by the driver.

Document US20130297162 A1 describes a method to dynamically adapt a shifting pattern based on information regarding the engine speed of the internal combustion engine and the engine speed of the electric motor in order to optimize the fuel consumption. Document U.S. Pat. No. 7,407,462 B2 describes a shift control apparatus for a continuously variable transmission where the shift pattern is changed according to the remaining charge of a battery. The shift pattern does not change during running. According to the document the shift pattern is changed, such that the gear ratio is lower when the battery is insufficiently charged.

SUMMARY OF THE INVENTION

Despite known solutions in the field, there is still a need to develop a method for gear shifting in a hybrid powertrain, which reduces the fuel consumption while optimizing the drivability and the performance.

An object of the present invention is to achieve an advantageous method for gear shifting in a hybrid powertrain, which reduces the fuel consumption while optimizing the drivability and the performance.

Another object of the invention is to achieve an advantageous system for gear shifting in a hybrid powertrain, which reduces the fuel consumption while optimizing the drivability and the performance.

The herein mentioned objects are achieved by a method for gear shifting in a hybrid powertrain, a system for gear shifting in a hybrid powertrain, a vehicle, a computer program and a computer program product according to the independent claims.

According to an aspect of the invention a method for gear shifting in a hybrid powertrain is provided. The hybrid powertrain comprises an internal combustion engine; an electric machine; a gearbox; and an energy storage unit connected to the electric machine, wherein at least one control unit is arranged in communication with the internal combustion engine, the electric machine, the gearbox and the energy storage unit. The method comprises the steps of:
  determining the energy level in the energy storage unit;
  determining the acceleration ability with the subsequent gear;
  determining a target engine speed for the internal combustion engine based on the energy level in the energy storage unit and the acceleration ability; and
  controlling the gear shifting based on the target engine speed.

The method steps are suitably performed by means of the control unit. The control unit may determine the energy level in the energy storage unit by means of a voltage sensor connected to the energy storage unit and the control unit.

The subsequent gear is suitably a higher gear. Thus, the step to determine the acceleration ability with the subsequent gear suitably includes determining the acceleration ability with the subsequent gear in case of upshifting.

The torque provided by an internal combustion engine may vary depending on the engine speed. Typically, the torque increases when the engine speed increases, up to a certain maximum level where the torque is essentially constant irrespectively of an increase in engine speed. However, when the engine speed increases further and reaches a certain high level the engine torque may start decreasing from the maximum level. Thus, the internal combustion engine is not able to provide the maximum torque at too low engine speeds or too high engine speeds. However, an electric machine may be able to provide the same maximum torque essentially immediately, i.e. at low engine speeds. When upshifting is performed the engine speed of the internal combustion engine will decrease due to the lower gear ratio of the subsequent higher gear. Gear shifting generally includes controlling the internal combustion engine towards a target engine speed. If the target engine speed can be maintained at the subsequent higher gear, the upshifting is performed. The lower the target engine speed is the earlier upshifting is possible. However, if the target engine speed is too low or the upshifting for any other reason is performed too early, the engine speed may decrease to a level where the internal combustion engine not is able to provide the desired torque. Therefore, the target engine speed is normally set to a relatively high level, such that it is ensured that the internal combustion engine can provide the maximum torque after upshifting. While this may be advantageous for maintaining the performance and drivability of the vehicle, high engine speeds will affect the fuel consumption negatively. By determining the energy level of the energy storage unit, determining the acceleration ability with the subsequent gear and determining a target engine speed for the internal combustion engine based on the energy level in the energy storage unit and the acceleration ability, gear shifting is achieved which enables a more frequent use of the electric machine and less use of the internal combustion engine. This way, a method for gear shifting is achieved which minimizes the fuel consumption. Also, by determining the target engine speed based on the acceleration ability with the subsequent gear the driveability is considered.

The acceleration ability is suitably defined as the acceleration which is possible to achieve when having changed to the subsequent gear.

Suitably, the target engine speed is determined such that it is set to a first engine speed when the determined energy level is below a threshold level and/or the determined acceleration ability is below a threshold level. Preferably, the target engine speed is determined such that it is set to a second engine speed when the determined energy level is above the threshold level and the determined acceleration ability is above the threshold level, wherein the second engine speed is lower than the first engine speed. This way, when it is determined that the energy level in the energy storage unit is above a threshold level, and the acceleration ability is above a threshold level the energy level may be used during gear shifting to drive the electric machine. The electric machine may then be able to provide torque in addition to the torque provided by the internal combustion engine. This way, upshifting can be performed at lower engine speeds even if it results in that the internal combustion engine cannot provide the desired torque at the subsequent gear. Hence, by determining the target engine speed based on the energy level and the acceleration ability upshifting may be performed earlier, at lower engine speeds, and the fuel consumption can be minimized while fulfilling the torque requirements and optimizing the driveability. Also, by only allowing a lower target engine speed when the energy level and the acceleration ability are above a certain level, it is ensured that the torque requirements are fulfilled and the driveability is thereby optimized.

Controlling the gear shifting based on the target engine speed suitably includes controlling the internal combustion engine, the gearbox and the electric machine. Controlling the gear shifting based on the target engine speed suitably includes changing gears such that the internal combustion engine essentially maintains the target engine speed.

The energy threshold level may be a predetermined arbitrary energy level. The energy threshold level is suitably an energy level enough for the electric machine to provide a minimum torque. The energy threshold level is suitably an energy level enough for the electric machine to provide a minimum torque during a certain time period or during a certain distance, for example 150-400 meters. The minimum torque may be a predetermined arbitrary torque value.

According to an aspect of the invention the acceleration ability with the subsequent gear is determined based on the traction force provided with the subsequent gear and the current driving resistance. The traction force provided with a certain gear is based on the provided torque, the gear ratio and the radius of the gearwheel. Higher gears have lower gear ratio than lower gears, thus the traction force with higher gears is lower than the traction force with lower gears, at the same provided torque. The current driving resistance may be based on the inclination of the road, air resistance and/or rolling resistance or similar. When the traction force is larger than the driving resistance a positive acceleration is achieved. The acceleration ability is thus determined as the acceleration achieved based on the traction force provided with the subsequent gear and the current driving resistance. By determining the acceleration ability with the subsequent gear it can be determined whether the acceleration will be enough not to affect the driveability negatively when changing to a higher gear. By determining the target engine speed based on the determined acceleration ability it is ensured that the driveability is optimized during gear shifting. The threshold level of the acceleration ability is suitably an arbitrary predetermined acceleration level. The threshold level of the acceleration ability may be an acceleration around 0.3-0.8 m/s$^2$. By setting a lower target engine speed, only when the acceleration ability is above a threshold level it is ensured that the driveability is optimized while minimizing the fuel consumption.

According to an aspect of the invention the second engine speed is based on the first engine speed. Suitably, the second engine speed is determined as the first engine speed decreased with a predetermined factor. The predetermined factor may be a percentage. The first engine speed may be the normal target engine speed, the starting point, which is used as long as the energy level and the acceleration ability do not comply with the requirements (threshold levels). The predetermined factor suitably depends on the energy level and the acceleration ability. The higher the energy level and the acceleration ability are the larger is the factor. Thus, the higher the energy level and the acceleration ability are the lower is the second engine speed. Thus, when there is a big difference between the determined energy level and acceleration ability and their respective threshold levels, the target engine speed is lower. This way it is ensured that the determined target engine speed is dynamically adapted to the prevailing conditions regarding the available energy level and the acceleration ability.

Alternatively, the second engine speed is an arbitrary predetermined engine speed, lower than the first engine speed. The second engine speed suitably depends on the determined energy level and the determined acceleration ability. The second engine speed is suitably lower the higher the determined energy level and acceleration ability is.

According to an aspect of the invention the electric machine is controlled based on the determined target engine speed. The electric machine is suitably controlled to provide torque when the target engine speed is set to the second engine speed. When the second engine speed is set as the target engine speed, the target engine speed is decreased and upshifting is performed earlier than when the target engine speed is set to the first engine speed. Thus, when the gear shifting results in the internal combustion engine not being able to provide a desired torque at the subsequent gear, the electric machine is controlled to provide the missing torque. This way, upshifting may be performed earlier, fuel consumption is minimized and the driveability is optimized. The electric machine is suitably controlled by the control unit and is driven by electric current/energy from the energy storage unit.

According to an aspect of the invention the method further comprises the step of, prior to determining the target engine speed:

determining the functionality of the electric machine.

By determining the energy level in the energy storage unit before determining the target engine speed it is ensured that enough energy is available to drive the electric machine. However, it is also important that the condition of the electric machine fulfils certain requirements or the electric machine might not be able to provide the desired torque irrespectively of the energy level in the energy storage unit. The method thus preferably comprises to determine whether the functionality of the electric machine is sufficient to provide a minimum torque, prior to determining the target engine speed. The minimum torque may be a predetermined arbitrary torque value. The minimum torque may be a predetermined torque value determined based on experience, i.e. empirically determined. Thus, if it is determined that the functionality of the electric machine is not sufficient to provide the minimum torque, the first engine speed is determined as the target engine speed. Similarly, if it is determined that the functionality of the electric machine is sufficient to provide the minimum torque, the second engine speed may be determined as the target engine speed, provided that the energy level and the acceleration ability are above their threshold levels. The functionality of the electric machine may be determined based on torque signals from the electric machine. The functionality may also be determined by determining the temperature of the electric machine. The temperature of the electric machine affects the overall performance of the electric machine and it is therefore advantageous to determine the temperature of the electric machine prior to determining the target engine speed. The performance of the electric machine is typically deteriorated when the temperature is too high. Suitably, when the determined temperature is above a temperature threshold the first engine speed is determined as the target engine speed. The second engine speed is suitably determined as the target engine speed when the temperature of the electric machine is below a temperature threshold, the energy level is above the energy level threshold and the acceleration ability is above the threshold level of the acceleration ability.

According to an aspect of the invention the target engine speed is determined based on a position of an accelerator pedal. Suitably, the first engine speed is determined based on a position of the accelerator pedal. The second engine speed may thereby also be determined based on the position of the accelerator pedal. Thus, different positions of the accelerator pedal are associated with different first engine speeds and different second engine speeds. This way, the target engine speed is different for different positions of the accelerator pedal. The target engine speed is suitably higher the more depressed the accelerator pedal is. The accelerator pedal is suitably linked either electronically, mechanically or by other systems to the control unit such that the control unit can determine the position of the accelerator pedal. The first engine speed is suitably predetermined and stored in the control unit. The first engine speed may be determined based on requested torque, driveability, and requested fuel consumption or similar. The first engine speed is suitably predetermined based on experience, i.e. empirically determined.

According to an aspect of the invention a system for gear shifting in a hybrid powertrain is provided. The powertrain comprises an internal combustion engine; an electric machine; a gearbox; and an energy storage unit connected to the electric machine, wherein at least one control unit is arranged in communication with the internal combustion engine, the electric machine, the gearbox and the energy storage unit. The control unit is adapted to determine the energy level in the energy storage unit, determine the acceleration ability with the subsequent gear in case of upshifting, determine a target engine speed for the internal combustion engine based on the energy level in the energy storage unit and the acceleration ability; and control the gear shifting based on the target engine speed.

The hybrid powertrain may comprise a clutch arranged between the internal combustion engine and the electric machine. The crankshaft of the internal combustion engine is thus suitably connected to one side of the clutch and the electric machine is connected to the other side of the clutch. The gearbox may comprise an input shaft connected to the electric machine and an output shaft connected to driving wheels of a vehicle. The gearbox may further comprise a lay shaft arranged in connection to the input shaft and a main shaft, where the main shaft is connected to the output shaft.

The control unit is suitably adapted to control the internal combustion engine, the clutch, the electric machine and the gearbox. A computer may be connected to the control unit.

The control unit is suitably adapted to determine the target engine speed such that it is set to a first engine speed when the determined energy level is below a threshold level and/or the determined acceleration ability is below a threshold level.

The control unit is suitably further adapted to determine the target engine speed such that it is set to a second engine speed when the determined energy level is above the threshold level and the determined acceleration ability is above the threshold level, wherein the second engine speed is lower than the first engine speed.

Further objects, advantages and novel features of the present invention will become apparent to one skilled in the art from the following details, and also by putting the invention into practice. Whereas the invention is described below, it should be noted that it is not restricted to the specific details described. Specialists having access to the teachings herein will recognize further applications, modifications and incorporations within other fields, which are within the scope of the invention.

BRIEF DESCRIPTION OF THE DRAWINGS

For fuller understanding of the present invention and further objects and advantages of it, the detailed description set out below should be read together with the accompanying drawings, in which the same reference notations denote similar items in the various diagrams, and in which.

DETAILED DESCRIPTION OF THE INVENTION

Figure 1:
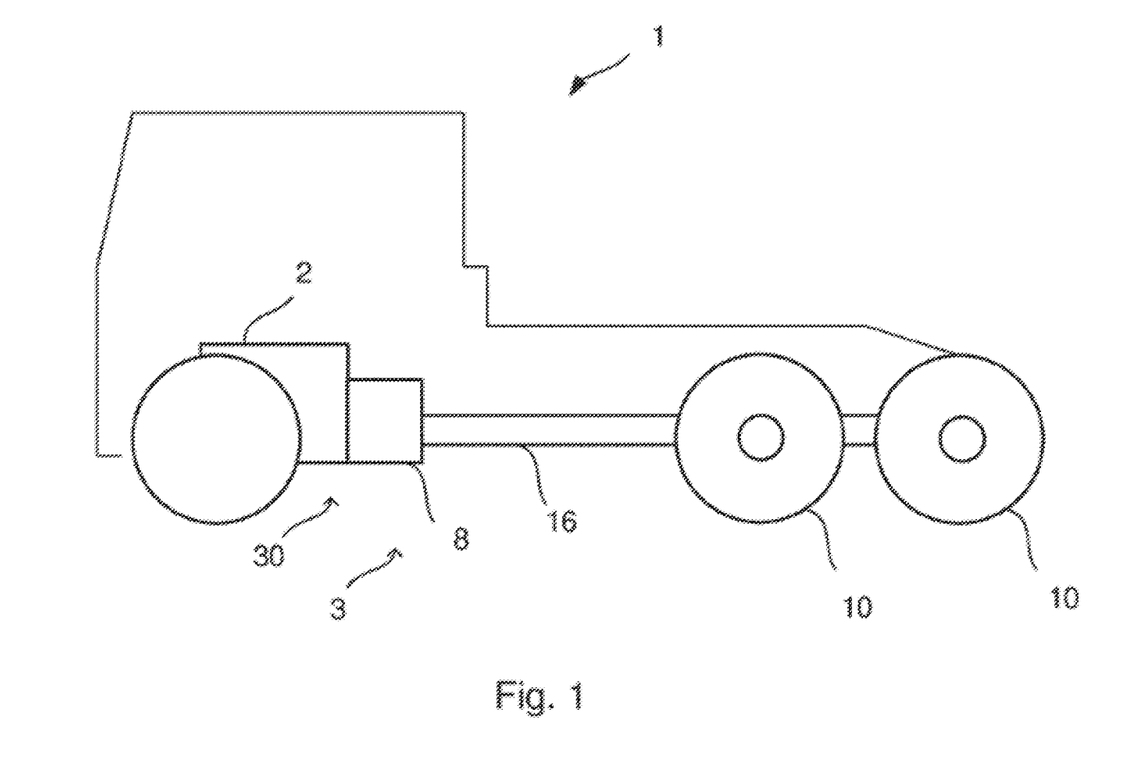
FIG. 1 schematically illustrates a vehicle according to an embodiment of the invention.

FIG. 1 schematically shows a side view of a hybrid vehicle 1 according to an embodiment of the invention. A hybrid vehicle is considered to be a vehicle with a hybrid powertrain, such that the vehicle may be propelled by an internal combustion engine and/or an electric machine. The vehicle 1 comprises a system 30 for gear shifting in a hybrid powertrain 3. The hybrid powertrain 3 comprises an internal combustion engine 2, an electric machine 6 (not shown) and a gearbox 8. The electric machine 6 is connected to the gearbox 8. The gearbox 8 is also connected to the driving wheels 10 of the vehicle 1 through an output shaft 16. The vehicle 1 may be a heavy vehicle, e.g. a truck or a bus. The vehicle 1 may alternatively be a passenger car.

Figure 2:
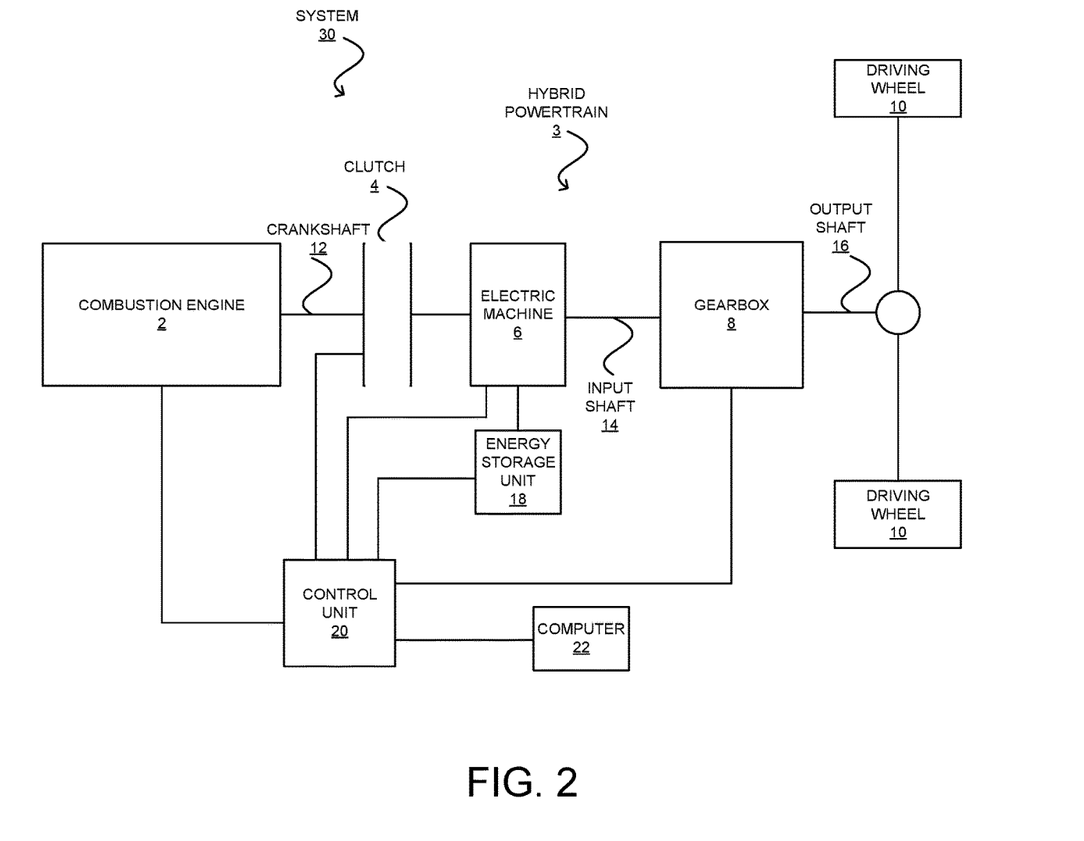
FIG. 2 schematically illustrates a system according to an embodiment of the invention.

FIG. 2 schematically shows a system 30 for gear shifting in a hybrid powertrain 3 of a vehicle 1 according to an embodiment of the invention. The hybrid powertrain 3 comprises a combustion engine 2, a clutch 4, an electric machine 6 and a gearbox 8. The crankshaft 12 of the combustion engine 2 is connected to one side of the clutch 4 and the electric machine 6 is connected to the other side of the clutch 4. The clutch 4 is thus arranged between the combustion engine 2 and the electric machine 6. The gearbox 8 comprises an input shaft 14 connected to the electric machine 6 and an output shaft 16 connected to the driving wheels 10 of the vehicle 1. Only two driving wheels 10 are illustrated in FIG. 2, however, any number of driving wheels 10 may be driven by the hybrid powertrain 3 within the scope of the invention. An energy storage unit 18 is arranged in communication with the electric machine 6 for supply of electric energy/current to drive the electric machine 6.

The combustion engine 2, the clutch 4, the electric machine 6, the gearbox 8 and the energy storage unit 18 are arranged in connection to a control unit 20. The control unit 20 is adapted to control the combustion engine 2, the clutch 4, the electric machine 6 and the gearbox 8, for example for gear shifting. A computer 22 may be connected to the control unit 20. The control unit 20 is suitably adapted to determine the energy level in the energy storage unit 18, determine the acceleration ability with the subsequent gear, determine a target engine speed for the internal combustion engine 2 based on the energy level in the energy storage unit 18 and the acceleration ability; and control the gear shifting based on the target engine speed.

Figure 3:
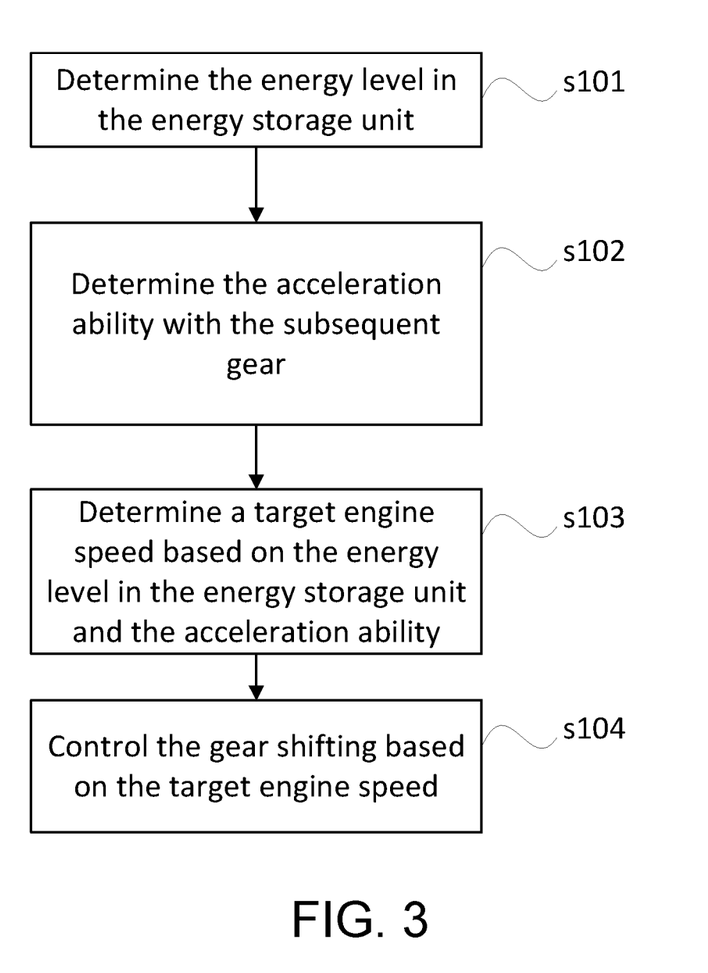
FIG. 3 schematically illustrates a flow chart for a method for gear shifting in a hybrid powertrain according to an embodiment of the invention.

FIG. 3 shows a flowchart for a method for gear shifting in a hybrid powertrain 3 according to an embodiment of the invention. The hybrid powertrain 3 is configured as described in relation to FIG. 2. The hybrid powertrain 3 comprises an internal combustion engine 2, an electric machine 6, a gearbox 8 and an energy storage unit 18 arranged in communication with the electric machine 6. At least one control unit 20 is arranged in communication with the internal combustion engine 2, the electric machine 6, the gearbox 8 and the energy storage unit 18. The method comprises the steps of determining s101 the energy level in the energy storage unit; determining s102 the acceleration ability with the subsequent gear; determining s103 a target engine speed for the internal combustion engine based on the energy level in the energy storage unit and the acceleration ability; and controlling s104 the gear shifting based on the target engine speed. By determining the energy level of the energy storage unit 18, determining the acceleration ability with the subsequent gear and determining a target engine speed for the internal combustion engine 2 based on the energy level in the energy storage unit 18 and the acceleration ability, gear shifting is achieved which enables a more frequent use of the electric machine 6 and less use of the internal combustion engine 2. This way, a method for gear shifting is achieved which minimizes the fuel consumption. Also, by determining the target engine speed based on the acceleration ability with the subsequent gear the driveability is optimized.

The method steps are suitably performed by means of the control unit 20. The control unit 20 may determine the energy level in the energy storage unit 18 by means of a voltage sensor connected to the energy storage unit 18 and the control unit 20.

The subsequent gear is suitably a higher gear. Thus, the step s102 to determine the acceleration ability with the subsequent gear suitably includes determining the acceleration ability with the subsequent higher gear, in case of upshifting.

The step to determine s103 the target engine speed suitably comprises to set the target engine speed to a first engine speed when the determined energy level is below a threshold level and/or the determined acceleration ability is below a threshold level. The step to determine s103 the target engine speed suitably further comprises to set the target engine speed to a second engine speed when the determined energy level is above the threshold level and the determined acceleration ability is above the threshold level, wherein the second engine speed is lower than the first engine speed. This way, when it is determined that the energy level in the energy storage unit 18 is above a threshold level, and the acceleration ability is above a threshold level the energy level may be used during gear shifting to drive the electric machine 6. Since the energy level and the acceleration ability are above their threshold levels, the electric machine 6 may be able to provide torque and upshifting can thereby be performed at a lower engine speed even though it results in the internal combustion engine 2 not being able to provide the desired torque at the subsequent gear. Hence, by determining the target engine speed based on the energy level and the acceleration ability upshifting may be performed earlier, at lower engine speeds, and the fuel consumption can be minimized while fulfilling the torque requirements.

The energy threshold level may be a predetermined arbitrary energy level. The energy threshold level is suitably an energy level enough for the electric machine 6 to provide a minimum torque. The energy threshold level is suitably an energy level enough for the electric machine 6 to provide a minimum torque during a certain time period or during a certain distance. The energy threshold level is suitably stored in the control unit 20.

The step to control s104 the gear shifting based on the target engine speed suitably includes controlling the internal combustion engine 2, the gearbox 6 and the electric machine 6. Controlling the gear shifting based on the target engine speed suitably includes changing gears such that the internal combustion engine 2 essentially maintains the target engine speed.

The acceleration ability with the subsequent gear is suitably determined in step s102 based on the traction force provided with the subsequent gear and the current driving resistance. The traction force provided with a certain gear is based on the provided torque, the gear ratio and the radius of the gearwheel. Higher gears have lower gear ratio than lower gears, thus the traction force with higher gears is lower than the traction force with lower gears, at the same provided torque. The current driving resistance may be based on the inclination of the road, air resistance and/or rolling resistance or similar. When the traction force is larger than the driving resistance a positive acceleration is achieved. The control unit 20 suitably determines the traction force, the current driving resistance and the acceleration ability of the subsequent higher gear.

The threshold level of the acceleration ability is suitably an arbitrary predetermined acceleration level. The threshold level of the acceleration ability may be an acceleration around 0.5-0.8 $m/s^2$. By setting a lower target engine speed, only when the acceleration ability is above a threshold level it is ensured that the driveability is optimized while minimizing the fuel consumption. The threshold level of the acceleration ability is suitably stored in the control unit 20.

The second engine speed is suitably determined based on the first engine speed. The second engine speed is suitably calculated as the first engine speed decreased with a predetermined factor. The predetermined factor suitably depends on the determined energy level and the determined acceleration ability. Suitably, the higher the energy level respectively acceleration ability the larger the factor and thus the lower the second engine speed. Thus, when the energy level and acceleration ability are much above their threshold levels, the target engine speed is lower. This way it is ensured that the determined target engine speed is dynamically adapted to the available energy level and the acceleration ability. The predetermined factor is suitably stored in the control unit 20 such that the control unit 20 can calculate the second engine speed.

Alternatively, the second engine speed is an arbitrary predetermined engine speed, lower than the first engine speed.

The method suitably comprises to control the electric machine 6 based on the determined target engine speed. The electric machine 6 is suitably controlled to provide torque when the target engine speed is set to the second engine speed. When the second engine speed is set as the target engine speed, the target engine speed is decreased and upshifting may be performed earlier. Thus, when the upshifting results in that the internal combustion engine 2 cannot provide a desired torque at the subsequent gear, the electric machine 6 is controlled to provide the missing torque. This way, upshifting may be performed earlier, fuel consumption is minimized and the driveability is optimized.

The method suitably further comprises the step of, prior to determining the target engine speed, determining s105 the functionality of the electric machine 6. By determining the energy level in the energy storage unit 18 before determining the target engine speed it is ensured that enough energy is available to drive the electric machine 6 such that the electric machine 6 can provide a minimum torque. However, it is also important that the condition of the electric machine 6 fulfils certain requirements or the electric machine 6 might not be able to provide the desired torque irrespectively of the energy level in the energy storage unit 18. The method thus preferably comprises to determine whether the functionality of the electric machine 6 is sufficient to provide a minimum torque, prior to determining the target engine speed. The minimum torque may be a predetermined arbitrary torque value. Thus, if it is determined that the functionality of the electric machine 6 is not sufficient to provide the minimum torque, the first engine speed is determined as the target engine speed. Similarly, if it is determined that the functionality of the electric machine 6 is sufficient to provide the minimum torque, the second engine speed may be determined as the target engine speed, provided that the energy level and the acceleration ability are above their threshold levels. The functionality of the electric machine 6 may be determined based on torque signals from the electric machine 6. It may also be determined by determining the temperature of the electric machine 6. The temperature of the electric machine 6 affects the overall performance of the electric machine 6 and it is therefore advantageous to determine the temperature of the electric machine 6 prior to determining the target engine speed. Suitably, when the determined temperature is above a temperature threshold the first engine speed is determined as the target engine speed. The second engine speed is suitably determined as the target engine speed when the temperature of the electric machine is below a temperature threshold, the energy level is above the energy level threshold and the acceleration ability is above the threshold level of the acceleration ability. The temperature threshold is suitably a predetermined value stored in the control unit 20.

The target engine speed may be determined in step s103 based on a position of an accelerator pedal. The first engine speed may be determined based on the position of the accelerator pedal and the second engine speed may thereby also be based on the position of the accelerator pedal. This way, the target engine speed is different for different positions of the accelerator pedal. The target engine speed is suitably higher the more depressed the accelerator pedal is. The accelerator pedal is suitably linked either electronically, mechanically or by other systems to the control unit 20 such that the control unit 20 can determine the position of the accelerator pedal.

Figure 4:
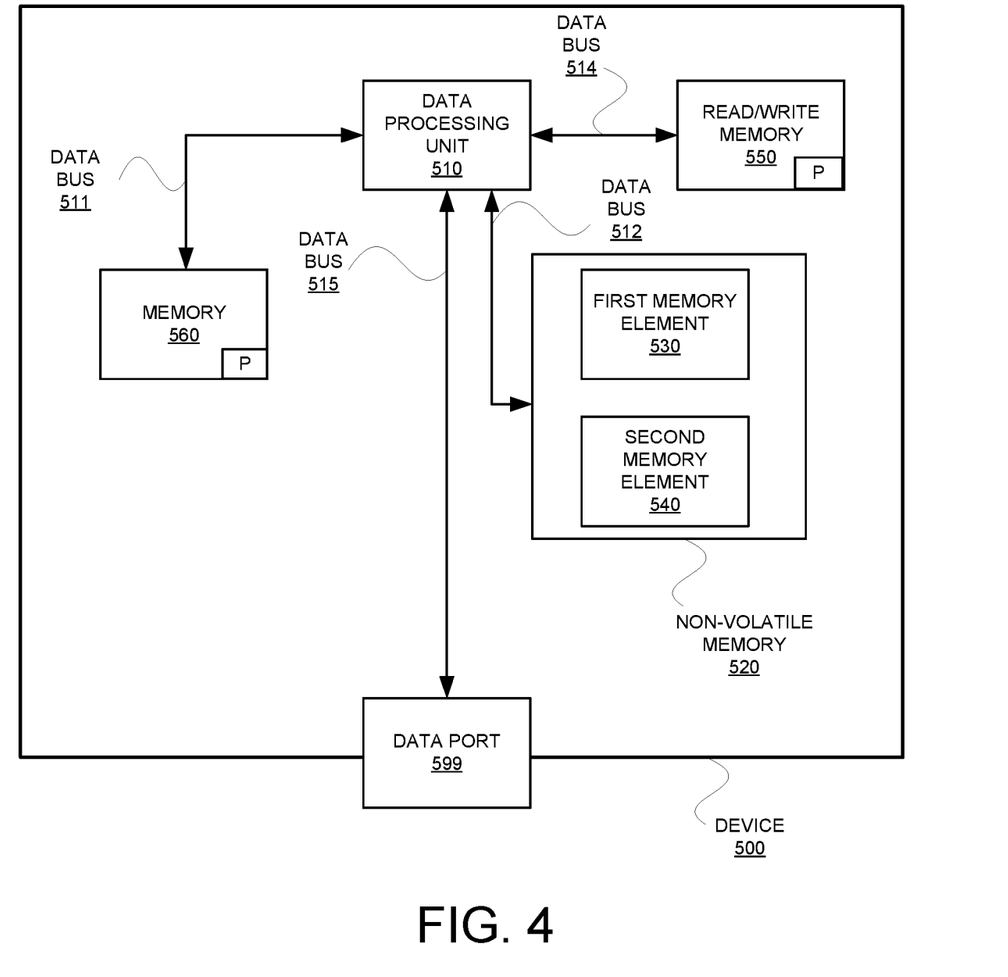
FIG. 4 schematically illustrates a control unit or computer according to an embodiment of the invention.

FIG. 4 schematically illustrates a device 500. The control unit 20 and/or computer 22 described with reference to FIG. 2-FIG. 3 may in a version comprise the device 500. The term "link" refers herein to a communication link which may be a physical connection such as an optoelectronic communication line, or a non-physical connection such as a wireless connection, e.g. a radio link or microwave link. The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an ND converter, a time and date input and transfer unit, an event counter and an interruption controller (not depicted). The non-volatile memory 520 has also a second memory element 540.

There is provided a computer program P which comprises routines for a method for gear shifting in a hybrid powertrain 3 according to the invention. The computer program P comprises routines for determining the energy level in the energy storage unit. The computer program P comprises routines for determining the acceleration ability with the subsequent gear in case of upshifting. The computer program P comprises routines for determining a target engine speed based on the determined energy level and the determined acceleration ability. The computer program P comprises routines for controlling gear shifting based on the determined target engine speed. The computer program P comprises routines for determining the functionality of the electric machine. The computer program P comprises routines for determining the temperature of the electric machine. The computer program P comprises routines for determining the ability of the electric machine to provide a minimum torque. The program P may be stored in an executable form or in a compressed form in a memory 560 and/or in a read/write memory 550.

Where the data processing unit 510 is described as performing a certain function, it means that the data processing unit 510 effects a certain part of the program stored in the memory 560 or a certain part of the program stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicating with the data processing unit 510 via a data bus 514.

When data are received on the data port 599, they are stored temporarily in the second memory element 540. When input data received have been temporarily stored, the data processing unit 510 is prepared to effect code execution as described above.

Parts of the methods herein described may be effected by the device 500 by means of the data processing unit 510 which runs the program stored in the memory 560 or the read/write memory 550. When the device 500 runs the program, methods herein described are executed.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various embodiments and with the various modifications appropriate to the intended use.

The invention claimed is:

1. A method for performing a gear shift operation in a hybrid powertrain associated with a vehicle, wherein the hybrid powertrain comprises a gear box with an input shaft, an internal combustion engine operatively connected to the input shaft of the gear box and an electric machine operatively connected to the input shaft of the gearbox; and an energy storage unit connected to the electric machine, wherein at least one control unit is arranged in communication with the internal combustion engine, the electric machine, the gearbox and the energy storage unit, said method for performing a gear shift operation comprising:
   determining an energy level of the energy storage unit;
   determining an acceleration ability indicating an amount of acceleration that is possible with upshifting to a higher gear based on a traction force provided with the higher gear and a current driving resistance associated with the vehicle;
   setting a target engine speed for the internal combustion engine, wherein the target engine speed is set based on both: i) a comparison of the energy level in the energy storage unit to an energy threshold level, and ii) a comparison of the acceleration ability with an acceleration threshold level, which comparisons indicate an amount of torque that can be provided by the electric machine for the gear shifting operation to the higher gear; and
   controlling both a gear shifting operation and the electric machine in the hybrid powertrain based on the target engine speed set for the internal combustion engine, such that internal combustion engine is maintained at substantially the target engine speed during gear shifting to the higher gear, by controlling the electric machine to provide torque to the input shaft of the gearbox in addition to torque provided by the internal combustion engine to the input shaft of the gear box as the internal combustion engine operates at the target engine speed, such that the torque provided by the electric machine provides sufficient added torque for gear upshifting to the higher gear while maintaining the internal combustion engine substantially at the target engine speed during the gear shifting operation.

2. The method according to claim 1, wherein the target engine speed is set to a first engine speed when the energy level determined in the energy storage unit is below the energy threshold level and/or the acceleration ability determined with the higher gear is below the acceleration threshold level.

3. The method according to claim 2, wherein the target engine speed is set to a second engine speed when the energy level determined in the energy storage unit is above the energy threshold level and the acceleration ability determined with the higher gear is above the acceleration threshold level, wherein the second engine speed is lower than the first engine speed.

4. The method according to claim 3, wherein the second engine speed is set based on the first engine speed.

5. The method according to claim 4, wherein the second engine speed is set as the first engine speed decreased by a predetermined factor.

6. The method according to claim 5, wherein the predetermined factor depends on the energy level determined and the acceleration ability determined.

7. The method according to claim 3, wherein the step of controlling the gear shifting and the electric machine includes controlling the electric machine to provide torque when the second engine speed is set as the target engine speed.

8. The method according to claim 1, wherein the method further comprises the step of, prior to setting the target engine speed:
   determining a functionality of the electric machine.

9. A system for performing a gear shift operation shifting in a hybrid powertrain associated with a vehicle, wherein the hybrid powertrain comprises a gear box with an input shaft, an internal combustion engine operatively connected to the input shaft of the gear box and an electric machine operatively connected to the input shaft of the gearbox; and an energy storage unit connected to the electric machine, and wherein said system comprises at least one control unit arranged in communication with the internal combustion engine, the electric machine, the gearbox and the energy storage unit, wherein the control unit comprises means for performing a gear shift operation of:
   determining an energy level of the energy storage unit;
   determining an acceleration ability indicating an amount of acceleration that is possible with upshifting to a higher gear based on a traction force provided with the higher gear and a current driving resistance associated with the vehicle;
   setting a target engine speed for the internal combustion engine, wherein the target engine speed is set based on both: i) a comparison of the energy level in the energy storage unit to an energy threshold level, and ii) a comparison of the acceleration ability with an acceleration threshold level, which comparisons indicate an amount of torque that can be provided by the electric machine for the gear shifting operation to the higher gear; and
   controlling both a gear shifting operation and the electric machine in the hybrid powertrain based on the target engine speed set for the internal combustion engine, such that internal combustion engine is maintained at substantially the target engine speed during gear shifting to the higher gear, by controlling the electric machine to provide torque to the input shaft of the gearbox in addition to torque provided by the internal combustion engine to the input shaft of the gear box as the internal combustion engine operates at the target engine speed, such that the torque provided by the electric machine provides sufficient added torque for gear upshifting to the higher gear while maintaining the internal combustion engine substantially at the target engine speed during the gear shifting operation.

10. The system according to claim 9, wherein the control unit comprises means for setting the target engine speed such that it is set to a first engine speed when the energy level determined in the energy storage unit is below the energy threshold level and/or the acceleration ability determined with the higher gear is below the acceleration threshold level.

11. The system according to claim 10, wherein the control unit comprises means for setting the target engine speed such that it is set to a second engine speed when the energy level determined in the energy storage unit is above the energy threshold level and the acceleration ability determined with the higher gear is above the acceleration threshold level, wherein the second engine speed is lower than the first engine speed.

12. A vehicle comprising a system for performing a gear shift operation in a hybrid powertrain, wherein the hybrid powertrain comprises a gear box with an input shaft, an internal combustion engine operatively connected to the input shaft of the gear box and an electric machine operatively connected to the input shaft of the gearbox; and an energy storage unit connected to the electric machine, and
wherein said system comprises at least one control unit arranged in communication with the internal combustion engine, the electric machine, the gearbox and the energy storage unit, wherein the control unit comprises means for performing a gear shift operation of:
determining an energy level of the energy storage unit;
determining an acceleration ability indicating an amount of acceleration that is possible with upshifting to a higher gear based on a traction force provided with the higher gear and a current driving resistance associated with the vehicle;
setting a target engine speed for the internal combustion engine, wherein the target engine speed is set based on both: i) a comparison of the energy level in the energy storage unit to an energy threshold level, and ii) a comparison of the acceleration ability with an acceleration threshold level, which comparisons indicate an amount of torque that can be provided by the electric machine for the gear shifting operation to the higher gear; and
controlling both a gear shifting operation and the electric machine in the hybrid powertrain based on the target engine speed set for the internal combustion engine, such that internal combustion engine is maintained at substantially the target engine speed during gear shifting to the higher gear, by controlling the electric machine to provide torque to the input shaft of the gearbox in addition to torque provided by the internal combustion engine to the input shaft of the gear box as the internal combustion engine operates at the target engine speed, such that the torque provided by the electric machine provides sufficient added torque for gear upshifting to the higher gear while maintaining the internal combustion engine substantially at the target engine speed during the gear shifting operation.

13. A computer program product comprising computer program code stored on a non-transitory computer-readable medium, said computer program product for performing a gear shift operation in a hybrid powertrain associated with a vehicle, wherein the hybrid powertrain comprises a gear box with an input shaft, an internal combustion engine operatively connected to the input shaft of the gear box and an electric machine operatively connected to the input shaft of the gearbox; and an energy storage unit connected to the electric machine; and at least one control unit arranged in communication with the internal combustion engine, the electric machine, the gearbox and the energy storage unit, said computer program product comprising computer instructions to cause said at least one control unit to perform the following operations:
determine an energy level of the energy storage unit;
determine an acceleration ability indicating an amount of acceleration that is possible with upshifting to a higher gear based on a traction force provided with the higher gear and a current driving resistance associated with the vehicle;
set a target engine speed for the internal combustion engine, wherein the target engine speed is set based on both: i) a comparison of the energy level in the energy storage unit to an energy threshold level, and ii) a comparison of the acceleration ability with an acceleration threshold level, which comparisons indicate an amount of torque that can be provided by the electric machine for the gear shifting operation to the higher gear; and
control both a gear shifting operation and the electric machine in the hybrid powertrain based on the target engine speed set for the internal combustion engine, such that internal combustion engine is maintained at substantially the target engine speed during gear shifting to the higher gear, by controlling the electric machine to provide torque to the input shaft of the gearbox in addition to torque provided by the internal combustion engine to the input shaft of the gear box as the internal combustion engine operates at the target engine speed, such that the torque provided by the electric machine provides sufficient added torque for gear upshifting to the higher gear while maintaining the internal combustion engine substantially at the target engine speed during the gear shifting operation.

* * * * *

UNITED STATES PATENT AND TRADEMARK OFFICE
CERTIFICATE OF CORRECTION

PATENT NO. : 11,370,291 B2
APPLICATION NO. : 15/779984
DATED : June 28, 2022
INVENTOR(S) : Afram Kourie It is certified that error appears in the above-identified patent and that said Letters Patent is hereby corrected as shown below:

In the Claims

In Column 12, Claim 9, Line 22, "shifting" should be removed.

Signed and Sealed this
Fifteenth Day of November, 2022

Katherine Kelly Vidal
*Director of the United States Patent and Trademark Office*